United States Patent
Brown et al.

(10) Patent No.: US 10,783,102 B2
(45) Date of Patent: Sep. 22, 2020

(54) DYNAMICALLY CONFIGURABLE HIGH PERFORMANCE DATABASE-AWARE HASH ENGINE

(71) Applicant: Oracle International Corporation, Redwood Shores, CA (US)

(72) Inventors: David Brown, Austin, TX (US); Rishabh Jain, Austin, TX (US); David Hawkins, Austin, TX (US)

(73) Assignee: Oracle International Corporation, Redwood Shores, CA (US)

( * ) Notice: Subject to any disclaimer, the term of this patent is extended or adjusted under 35 U.S.C. 154(b) by 18 days.

(21) Appl. No.: 15/290,357

(22) Filed: Oct. 11, 2016

(65) Prior Publication Data

US 2018/0101530 A1   Apr. 12, 2018

(51) Int. Cl.
  *G06F 13/28*   (2006.01)
  *G06F 11/10*   (2006.01)

(52) U.S. Cl.
  CPC .......... *G06F 13/28* (2013.01); *G06F 11/1004* (2013.01)

(58) Field of Classification Search
  CPC .......... G06F 13/28; G06F 1/12; G06F 3/0619; G06F 3/0647; G06F 3/0683
  See application file for complete search history.

(56) References Cited

U.S. PATENT DOCUMENTS

| | | |
|---|---|---|
| 4,626,829 A | 12/1986 | Hauck |
| 5,109,226 A | 4/1992 | MacLean |
| RE34,052 E | 9/1992 | Hester et al. |
| 5,175,810 A | 12/1992 | Young et al. |
| 5,287,193 A | 2/1994 | Lin |
| 5,423,010 A | 6/1995 | Mizukami |
| 5,511,190 A | 4/1996 | Sharma et al. |

(Continued)

FOREIGN PATENT DOCUMENTS

| | | |
|---|---|---|
| CN | 1711563 A | 12/2005 |
| CN | 101251791 A | 8/2008 |

(Continued)

OTHER PUBLICATIONS

Kociubes, U.S. Appl. No. 14/806,576, filed Jul. 22, 2015, Notice of Allowance, dated Apr. 11, 2018.

(Continued)

*Primary Examiner* — Ashish Thomas
*Assistant Examiner* — Aryan D Toughiry
(74) *Attorney, Agent, or Firm* — Hickman Palermo Becker Bingham LLP

(57) ABSTRACT

Techniques are provided for configuring and operating hardware to sustain real-time hashing throughput. In an embodiment, during a first set of clock cycles, a particular amount of data items of a first data column are transferred into multiple hash lanes. During a second set of clock cycles, the same particular amount of data items of a second data column are transferred into the hash lanes. The transferred data items of the first and second data columns are then processed to calculate a set of hash values. When combined with techniques such as pipelining and horizontal scaling, the loading, hashing, and other processing occur in real time at the full speed of the underlying data path. For example, hashing throughput may sustainably equal or exceed the throughput of main memory.

20 Claims, 10 Drawing Sheets

(56) References Cited

U.S. PATENT DOCUMENTS

| | | |
|---|---|---|
| 5,581,705 A | 12/1996 | Passint et al. |
| 5,592,622 A | 1/1997 | Isfeld |
| 5,617,567 A | 4/1997 | Doktor |
| 5,655,080 A | 8/1997 | Dias et al. |
| 5,675,382 A | 10/1997 | Bauchspies |
| 5,696,956 A | 12/1997 | Razdan et al. |
| 5,696,959 A | 12/1997 | Guttag |
| 5,706,495 A | 1/1998 | Chadha et al. |
| 5,826,529 A | 10/1998 | Doktor |
| 5,884,299 A | 3/1999 | Ramesh |
| 5,887,183 A | 3/1999 | Agarwal |
| 5,933,650 A | 8/1999 | Van Hook |
| 5,987,407 A | 11/1999 | Wu |
| 5,996,708 A | 12/1999 | Gerold |
| 6,006,179 A | 12/1999 | Wu |
| 6,047,081 A | 4/2000 | Groezinger et al. |
| 6,065,070 A | 5/2000 | Johnson |
| 6,118,724 A | 9/2000 | Higginbottom |
| 6,161,173 A | 12/2000 | Krishna |
| 6,178,405 B1 | 1/2001 | Ouyang |
| 6,219,457 B1 | 4/2001 | Potu |
| 6,317,824 B1 | 11/2001 | Thakkar et al. |
| 6,331,826 B1 | 12/2001 | Wagner |
| 6,336,180 B1 | 1/2002 | Long |
| 6,381,601 B1 | 4/2002 | Fujiwara et al. |
| 6,416,410 B1 | 7/2002 | Abou-Samra |
| 6,496,915 B1 | 12/2002 | Halleck |
| 6,604,155 B1 | 8/2003 | Chong et al. |
| 6,671,797 B1 | 12/2003 | Golston |
| 6,745,174 B2 | 6/2004 | Levy et al. |
| 6,779,105 B1 | 8/2004 | Bouyoux |
| 6,829,697 B1 | 12/2004 | Davis et al. |
| 6,842,848 B2 | 1/2005 | Hokenek et al. |
| 6,996,569 B1 | 2/2006 | Bedell et al. |
| 7,047,252 B2 | 5/2006 | Buch et al. |
| 7,490,221 B2 | 2/2009 | Evans |
| 7,617,346 B2 | 11/2009 | Wang et al. |
| 7,725,595 B1 | 5/2010 | Geissler et al. |
| 7,769,726 B2 | 8/2010 | Faerber et al. |
| 7,861,060 B1 | 12/2010 | Nickolls |
| 7,991,794 B2 | 8/2011 | Bedi et al. |
| 8,049,760 B2 | 11/2011 | Jiao et al. |
| 8,126,855 B2 | 2/2012 | Faerber et al. |
| 8,260,803 B2 | 9/2012 | Hsu et al. |
| 8,285,709 B2 | 10/2012 | Candea et al. |
| 8,326,810 B2 | 12/2012 | Faerber et al. |
| 8,375,145 B2 | 2/2013 | Kagan et al. |
| 8,521,788 B2 | 8/2013 | Ellison et al. |
| 8,533,216 B2 | 9/2013 | Buger et al. |
| 8,543,534 B2 | 9/2013 | Alves et al. |
| 8,572,131 B2 | 10/2013 | Ellison et al. |
| 8,589,613 B2 | 11/2013 | Griggs |
| 8,667,252 B2 | 3/2014 | Colavin et al. |
| 8,725,707 B2 | 5/2014 | Chen et al. |
| 8,826,522 B2 | 9/2014 | Roblot |
| 8,938,644 B2 | 1/2015 | Clark et al. |
| 8,996,463 B2 | 3/2015 | Merriman et al. |
| 9,405,476 B2 | 8/2016 | Joshi et al. |
| 9,432,298 B1* | 8/2016 | Smith ............... H04L 49/9057 |
| 9,658,675 B1 | 5/2017 | Witek |
| 9,658,676 B1 | 5/2017 | Witek |
| 9,977,664 B2 | 5/2018 | Toyama |
| 2001/0037345 A1 | 11/2001 | Kiernan et al. |
| 2002/0032678 A1 | 3/2002 | Cornwell et al. |
| 2002/0033762 A1 | 3/2002 | Belu |
| 2002/0091826 A1 | 7/2002 | Comeau |
| 2002/0091905 A1 | 7/2002 | Krishna |
| 2002/0095562 A1 | 7/2002 | Nakanishi |
| 2002/0154154 A1 | 10/2002 | Cornelius |
| 2002/0165896 A1 | 11/2002 | Kim |
| 2002/0184392 A1 | 12/2002 | Parthasarathy et al. |
| 2002/0188830 A1 | 12/2002 | Boles et al. |
| 2003/0135495 A1 | 7/2003 | Vagnozzi |
| 2003/0167460 A1 | 9/2003 | Desai et al. |
| 2003/0182464 A1 | 9/2003 | Hamilton |
| 2003/0187858 A1 | 10/2003 | Kirk et al. |
| 2004/0030863 A1 | 2/2004 | Paver |
| 2004/0068642 A1 | 4/2004 | Tanaka |
| 2004/0160446 A1 | 8/2004 | Gosalia |
| 2004/0221192 A1 | 11/2004 | Motta |
| 2005/0091256 A1 | 4/2005 | Rathakrishnan et al. |
| 2005/0177706 A1 | 8/2005 | Lee |
| 2006/0116989 A1 | 6/2006 | Bellamkonda et al. |
| 2006/0179255 A1 | 8/2006 | Yamazaki |
| 2007/0061600 A1 | 3/2007 | Kuroda |
| 2007/0074214 A1 | 3/2007 | Ueno |
| 2007/0203925 A1 | 8/2007 | Sandler et al. |
| 2008/0046686 A1 | 2/2008 | Cameron |
| 2008/0134213 A1 | 6/2008 | Alverson |
| 2008/0294863 A1 | 11/2008 | Faerber et al. |
| 2009/0028192 A1* | 1/2009 | Rieger ............... H04H 20/42 370/535 |
| 2009/0037700 A1 | 2/2009 | Graham |
| 2009/0055350 A1 | 2/2009 | Branish et al. |
| 2009/0094193 A1 | 4/2009 | King et al. |
| 2009/0235047 A1 | 9/2009 | Hachmann |
| 2009/0287628 A1 | 11/2009 | Indeck |
| 2009/0287637 A1 | 11/2009 | Day et al. |
| 2009/0313210 A1 | 12/2009 | Bestgen et al. |
| 2010/0020880 A1* | 1/2010 | Susnow ........... H03K 19/17732 375/240.16 |
| 2010/0030728 A1 | 2/2010 | Chakkappen et al. |
| 2010/0030796 A1 | 2/2010 | Netz et al. |
| 2010/0082705 A1 | 4/2010 | Bhashyam et al. |
| 2010/0088309 A1 | 4/2010 | Petcelescu et al. |
| 2010/0106944 A1 | 4/2010 | Symes |
| 2010/0115295 A1 | 5/2010 | Diab |
| 2010/0115347 A1 | 5/2010 | Noyes |
| 2010/0161646 A1 | 6/2010 | Ceballos et al. |
| 2010/0191918 A1 | 7/2010 | Lee et al. |
| 2010/0257391 A1 | 10/2010 | Dung |
| 2010/0278446 A1 | 11/2010 | Ganesh et al. |
| 2010/0299316 A1 | 11/2010 | Faerber et al. |
| 2011/0029557 A1 | 2/2011 | Raghavan et al. |
| 2011/0106804 A1 | 5/2011 | Keeler et al. |
| 2011/0228325 A1 | 9/2011 | Shiraishi |
| 2012/0005509 A1 | 1/2012 | Araki |
| 2012/0014265 A1* | 1/2012 | Schlansker ............. H04L 43/18 370/252 |
| 2012/0054225 A1 | 3/2012 | Marwah et al. |
| 2012/0071152 A1 | 3/2012 | Roundtree |
| 2012/0159448 A1 | 6/2012 | Arcese |
| 2012/0166447 A1 | 6/2012 | Nice |
| 2012/0197868 A1 | 8/2012 | Fauser |
| 2012/0209873 A1 | 8/2012 | He |
| 2012/0234908 A1* | 9/2012 | Wang ............... H04L 9/3268 235/375 |
| 2013/0151458 A1 | 6/2013 | Indeck |
| 2013/0151567 A1 | 6/2013 | Ellison et al. |
| 2013/0151568 A1 | 6/2013 | Ellison et al. |
| 2013/0275473 A1 | 10/2013 | Ellison et al. |
| 2013/0303663 A1 | 11/2013 | Agnely et al. |
| 2014/0013076 A1 | 1/2014 | Ganesh et al. |
| 2014/0013077 A1 | 1/2014 | Ganesh et al. |
| 2014/0013078 A1 | 1/2014 | Ganesh et al. |
| 2014/0052713 A1 | 2/2014 | Schauer et al. |
| 2014/0052726 A1* | 2/2014 | Amberg ............... G06F 16/244 707/737 |
| 2014/0068183 A1* | 3/2014 | Joshi ............... G06F 12/0866 711/114 |
| 2014/0074818 A1 | 3/2014 | Barber |
| 2014/0095748 A1 | 4/2014 | Aingaran et al. |
| 2014/0096145 A1 | 4/2014 | Aingaran et al. |
| 2014/0208138 A1 | 7/2014 | Homchaudhuri |
| 2014/0208331 A1 | 7/2014 | Li |
| 2014/0281354 A1* | 9/2014 | Tkacik ............... G06F 12/1009 711/206 |
| 2014/0304490 A1 | 10/2014 | Toyama |
| 2015/0046411 A1 | 2/2015 | Kazmaier |
| 2015/0074384 A1* | 3/2015 | Yajima ............... G06F 21/575 713/2 |
| 2015/0088926 A1 | 3/2015 | Chavan et al. |
| 2015/0181273 A1 | 6/2015 | Shaool |

(56) References Cited

U.S. PATENT DOCUMENTS

| | | | |
|---|---|---|---|
| 2015/0261535 | A1 | 9/2015 | Snyder, II |
| 2016/0007037 | A1 | 1/2016 | Zhao et al. |
| 2016/0019064 | A1 | 1/2016 | Brooks et al. |
| 2016/0285623 | A1* | 9/2016 | Yoon .................. G06F 21/6227 |
| 2016/0350347 | A1 | 12/2016 | Das et al. |
| 2016/0352342 | A1* | 12/2016 | Fujiwara .................. H03L 7/16 |
| 2017/0024435 | A1 | 1/2017 | Kociubes et al. |
| 2017/0039238 | A1* | 2/2017 | Elias ..................... G06F 16/951 |
| 2017/0060587 | A1 | 3/2017 | Chavan |
| 2017/0085378 | A1* | 3/2017 | Shields ..................... H04L 9/12 |
| 2017/0185527 | A1* | 6/2017 | Ueda .................. G06F 12/1018 |
| 2017/0270052 | A1 | 9/2017 | Brown et al. |
| 2017/0270053 | A1 | 9/2017 | Brown |
| 2017/0272231 | A1* | 9/2017 | Chen ..................... H04L 7/0016 |
| 2017/0322725 | A1* | 11/2017 | Klingenberg .......... G06N 7/005 |
| 2018/0004242 | A1* | 1/2018 | Suresh ..................... G09C 1/00 |
| 2018/0004581 | A1 | 1/2018 | Brown |
| 2018/0067889 | A1 | 3/2018 | Brown |
| 2018/0107627 | A1 | 4/2018 | LeBeane et al. |

FOREIGN PATENT DOCUMENTS

| | | | |
|---|---|---|---|
| CN | 10930358 | A | 12/2010 |
| CN | 10217695 | A | 8/2011 |
| EP | 1 111 500 | A1 | 3/1996 |
| EP | 2040180 | A1 | 3/2009 |
| EP | 2423843 | A1 | 2/2012 |
| GB | 2 306 868 | A | 5/1997 |
| GB | 2338095 | A | 12/1999 |
| JP | 2000261674 | A | 9/2000 |
| WO | WO 00/08552 | A1 | 2/2000 |
| WO | WO2010/039895 | | 4/2010 |
| WO | WO 2013/095653 | A1 | 6/2013 |
| WO | WO 2013/095662 | A1 | 6/2013 |

OTHER PUBLICATIONS

Kociubes U.S. Appl. No. 14/806,576, filed Jul. 22, 2015, Interview Summary, dated Feb. 14, 2018.
Coprocessor Wizard, Platform Studio, http://www.xilinx.com/itp/xilinx10/help/platform_studio/ps_c_cpw_coprocessor_wizard.htm, 2008, 2 pages.
Binkert et al., "A Simple Integrated Network Interface for High-Bandwidth Servers", dated Jan. 2006, 22 pages.
Ganesh, U.S. Appl. No. 14/023,064, filed Sep. 10, 2013, Notice of Allowance, dated Jun. 16, 2017.
Chavan, U.S. Appl. No. 14/3385,219, filed Jul. 22, 2014, Office Action, dated Jun. 2, 2017.
Brooks, U.S. Appl. No. 14/867,929, filed Sep. 28, 2015, Office Action, dated Jul. 13, 2017.
Schlegel et al., "Fast Integer Compression Using SIMD Instructions", dated 2010, ACM, 7 pages.
Chavan, U.S. Appl. No. 14/338,219, filed Jul. 22, 2014, Notice of Allowance, dated Sep. 25, 2017.
Chavan, U.S. Appl. No. 14/338,219, filed 047/22/2014, Interview Summary, dated Sep. 11, 2017.
Brown, U.S. Appl. No. 15/074,248, filed Mar. 18, 2016, Office Action, dated Sep. 25, 2017.
Brown, U.S. Appl. No. 15/073,905, filed Mar. 18, 2016, Office Action, dated Sep. 25, 2017.
Ganesh, U.S. Appl. No. 14/023,249, filed Sep. 10, 2013, Notice of Allowance, dated Feb. 27, 2017.
Chavan, U.S. Appl. No. 14/338,219, filed Jul. 22, 2014, Restriction Requirement, dated Jan. 13, 2017.
Chandramohan A. Thekkath et al. "Separating Data and Control Transfer in Distributed Operating Systems", Architectural Support for Programming Languages and Operating Systems, dated Nov. 1, 1994, 10 pgs.
Chavan, U.S. Appl. No. 15/211,418, filed Jul. 15, 2016, Office Action, dated May 4, 2018.
Brown, U.S. Appl. No. 15/362,688, filed Nov. 28, 2016, Notice of Allowance, dated Apr. 25, 2018.
Brown, U.S. Appl. No. 15/073,905, filed Mar. 18, 2016, Notice of Allowance, dated Apr. 24, 2018.
Brooks, U.S. Appl. No. 14/867,929, filed Sep. 28, 2015, Final Office Action, dated May 31, 2018.
Brooks, U.S. Appl. No. 14/867,929, filed Sep. 28, 2015, Interview Summary, dated Apr. 25, 2018.
U.S. Appl. No. 13/590,110, filed Aug. 20, 2012, Office Action, dated Dec. 18, 2013.
U.S. Appl. No. 13/590,057, filed Aug. 20, 2012, Advisory Action, dated Feb. 26, 2015.
U.S. Appl. No. 13/590,057, filed Aug. 20, 2012, Final Office Action, dated Oct. 19, 2015.
U.S. Appl. No. 13/590,057, filed Aug. 20, 2012, Final Office Action, dated Nov. 18, 2014.
U.S. Appl. No. 13/590,057, filed Aug. 20, 2012, Notice of Allowance, dated Sep. 30, 2016.
U.S. Appl. No. 13/590,057, filed Aug. 20, 2012, Office Action, dated Apr. 22, 2015.
U.S. Appl. No. 13/590,057, filed Aug. 20, 2012, Office Action, dated Jul. 1, 2014.
U.S. Appl. No. 13/590,110, filed Aug. 20, 2012, Final Office Action, dated Mar. 27, 2015.
U.S. Appl. No. 13/590,110, filed Aug. 20, 2012, Office Action, dated Apr. 14, 2016.
U.S. Appl. No. 13/590,0547, filed Aug. 20, 2012, Advisory Action, dated Feb. 11, 2016.
U.S. Appl. No. 13/590,110, filed Aug. 20, 2012, Office Action, dated Oct. 2, 2015.
U.S. Appl. No. 13/590,057, filed Aug. 20, 2012, Advisory Action, dated Feb. 11, 2016.
U.S. Appl. No. 13/590,110, filed Aug. 20, 2012, Notice of Allowance, dated Aug. 1, 2016.
U.S. Appl. No. 14/023,064, filed Sep. 10, 2013, Final Office Action, dated Oct. 6, 2016.
U.S. Appl. No. 14/023,064, filed Sep. 10, 2013, Office Action, dated Mar. 28, 2016.
U.S. Appl. No. 14/023,249, filed Sep. 10, 2013, Office Action, dated Jan. 20, 2016.
U.S. Appl. No. 14/023,249, filed Sep. 10, 2013, Office Action, dated Aug. 25, 2016.
U.S. Appl. No. 13/590,057, filed Aug. 20, 2012, Office Action, dated Jan. 7, 2014.
U.S. Appl. No. 13/590,110, filed Aug. 20, 2012, Office Action, dated Jul. 1, 2014.
Brown, U.S. Appl. No. 15/197,436, filed Jun. 29, 2016, Final Office Action, dated Jun. 11, 2018.
U.S. Appl. No. 15/362,693, filed Nov. 28, 2016, Notice of Allowance, dated Aug. 7, 2018.
Brown, U.S. Appl. No. 15/256,936, filed Sep. 6, 2016, Office Action, dated Sep. 20, 2018.
Brown, U.S. Appl. No. 15/197,436, filed Jun. 29, 2016, Advisory Action, dated Sep. 7, 2018.
Brooks, U.S. Appl. No. 14/867,929, filed Sep. 28, 2015, Advisory Action, dated Aug. 28, 2018.
Jain, U.S. Appl. No. 15/362,673, filed Nov. 28, 2016, Notice of Allowance, dated Jun. 14, 2019.
Brown, U.S. Appl. No. 15/256,936, filed Sep. 6, 2016, Suplemental Notice of Allowability, dated May 24, 2019.
Brown, U.S. Appl. No. 16/57,793, filed Jun. 28, 2019, Office Action, dated Jan. 31, 2020.
Brown, U.S. Appl. No. 16/457,793, filed Jun. 28, 2019, Notice of Allowance, dated Feb. 20, 2020.
Brown, U.S. Appl. No. 15/197,436, filed Jun. 29, 2016, Notice of Allowance, dated Feb. 5, 2020.
Silva et al., "Using a Tighly-Coupled Pipeline in Dynamically Reconfigureable Platform FPGAs", dated May 2003, 4 pages.
"MonetDB'", Wikipedia, available: http://en.wikipedia.org/wiki/MonetDB, dated May 16, 2012, 3 pages.
Anonymous:, "Hash Table—Wikipedia, the free encyclopedia", dated Jun. 20, 2012, retrieved from the internet: http://wayback.archive.org/wiki/harshtable, 18 pages.

(56) References Cited

OTHER PUBLICATIONS

Brewer et al., "Remote Queues: Exposing Message Queues for Optimization and Atomicity", dated Jul. 17, 1995, ACM, 12 pages.
CCCP: Accelerator Virtualization, http://cccp.eecs.umich.edu/research/virtual.php, printed on Jul. 4, 2012, 3 pages.
Dynamic Scheduling Techniques, http://www.cs.iastate.edu/~prabhu/Tutorial/PIPELINE/dynamSchedTech.html, printed on Jul. 4, 2012, 2 pages.
IBM, "Data Packing and Unpacking Scheme for High Performance Image Processing", vol. 36., No. 7, dated Jul. 1993, 6 pages.
"Column Store Features" monedb, available: http://moneybd.org/Home/Features, dated 2008-2013, 3 pages.
Schmit et al., "PipeRench: A Virtualized Programmable Datapath in 0.18 Micron Technology", dated 2002, 4 pages.
Zukowski, M. "Vectorwise: Beyond Column Stores" ACTIAN 2012, 17 pages.
W. Cockshott et al., "High-Performance Operations Using a Compressed Database Architecture", The Computer Journal, vol. 41, 1998, 14 pages.
Weinhardt, Markus, "Compilation and Pipeline Synthesis for Reconfigurable Architectures", 1997, 8 pages.
Wikipedia, "In Memory Database", Dated Jan. 30, 2013, 4 pages.
Wikipedia, "SIMD", Single Instruction Multiple Instruction, dated Jan. 1, 2013, 7 pages.
Zhou et al., "Efficient SIMD Optimization for Media Processors", Journal of Zhejiang University Science A, dated Apr. 2008, 7 pages.
Park et al., "Polymorphic Pipeline Array: A Flexible Multicore Accelerator with Virtualized Execution for Mobile Multimedia Applications", Dated Dec. 12, 2009 11 pages.
Brown, U.S. Appl. No. 15/197,436, filed Jun. 29, 2016, Office Action, dated Dec. 13, 2018.
Brownb, U.S. Appl. No. 15/197,436, filed Jun. 29, 2016, Final Office Action, dated Mar. 28, 2019.
Brown, U.S. Appl. No. 15/256,936, filed Sep. 6, 2016, Notice of Allowance, dated Mar. 29, 2019.
Brown, U.S. Appl. No. 15/197,436, filed Jun. 29, 2016, Interview Summary, dated Feb. 25, 2019.
Brooks, U.S. Appl. No. 14/867,929, filed Sep. 28, 2015, Office Action, dated Mar. 18, 2019.
Jain, U.S. Appl. No. 15/362,673, filed Nov. 28, 2016, Office Action, dated Mar. 28, 2019.
Thekkath et al, "Separating Data and Control Transfer in Distributed Operating Systems", ASPLOS, San Jose, ACM, dated 1994, 10 pages.
Chavan, U.S. Appl. No. 15/211,418, filed Jul. 15, 2016, Notice of Allowance, dated Oct. 31, 2018.
Brown, U.S. Appl. No. 15/197,4736, filed Jun. 29, 2016, Office Action, dated Dec. 13, 2018.
Brown, U.S. Appl. No. 15/256,936, filed Sep. 6, 2016, Interview Summary, dated Dec. 19, 2018.
Brown, U.S. Appl. No. 15/197,436, filed Jun. 29, 2016, Office Action, dated Nov. 29, 2017.

\* cited by examiner

DYNAMICALLY CONFIGURABLE HIGH PERFORMANCE DATABASE-AWARE HASH ENGINE

FIELD OF THE DISCLOSURE

This disclosure relates to hash engine hardware. Techniques are presented for achieving software configurability and sustaining real time throughput.

BACKGROUND

Hash functions are used in network and database processing and cyclic redundancy checks (CRC). Different applications have different processing throughput requirements. Some networking applications require a hash to be performed in real time at data-rate speeds. Such hashing may be done on a network packet basis and may be conducive to hardware acceleration. In lower bandwidth applications, where either the amount of data to be hashed is minimal in comparison to the overall amount of processing or where a hash is infrequently required, hardware acceleration is typically not used. In these applications, software running on a processor core may perform a hash using the core itself. In some cases, the core may have a CRC instruction that facilitates hash calculations. The data to be hashed is provided as an argument to the CRC instruction, and the resultant CRC is stored in a processor output register. The application can hash more data by issuing the CRC instruction multiple times, using the existing CRC as a partial hash to start with and additional data as an argument to the CRC instruction.

In database applications, a hash may need to be calculated for each row of a table, and may be performed on one or more key columns of the table. For example, a database may use hashing for an index or a join operation. Previous solutions for calculating a hash on table data involved doing either of the following two techniques. In the first technique, software loads the key columns into memory and applies a hash function using a general-purpose processor core. This could be done with either specialized hash instructions or logical/arithmetic operations. In the second technique, software packs the elements of a row to be hashed into a data structure and then feeds the data structure into a hash coprocessor and/or uses a general-purpose processor to perform the hash.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:
  1.0 General Overview
  2.0 Example Computer
  3.0 Example Hash Lane Process
  4.0 Coordinated Loading of Hash Lanes
  5.0 Database and DMA
  6.0 Packet Sniffing
  7.0 Content Routing
  8.0 Seeding and Resumption
  9.0 Descriptors
  10.0 Progress Pointer
  11.0 Hardware Overview 1.0 General Overview Techniques are provided for configuring and operating hardware to sustain real-time hashing throughput. In an embodiment, during a first set of clock cycles, a particular amount of data items of a first data column are transferred into multiple hash lanes. During a second set of clock cycles, the same particular amount of data items of a second data column are transferred into the hash lanes. The particular amount of data items of the first and second data columns are then processed to calculate a set of hash values. When combined with techniques such as pipelining and horizontal scaling, the loading, hashing, and other processing occur in real time at the full speed of the underlying data path. For example, hashing throughput may sustainably equal or exceed the throughput of main memory.

Downstream routing of content may be based on a calculated hash value. Applications include database scans and joins and network packet sniffing.

Within the hash engine, the throughput of parallel hash lanes may be aggregated. If the data stream naturally contains rows, such as from a table or other source of records, then data items (column values) of a same row are loaded into a same hash lane of several lanes.

Descriptors may be used to achieve software configurability of column loading and hashing. A progress pointer may be adjusted to keep track of which data items will next be loaded into a hash lane. Partial hashes across part of a row of a table can be calculated and stored, and then completed and/or resumed when additional columns of the row are fed into the hash lane. This may include preempting work in progress that gets resumed at a later time. Additional flexibility can be achieved by hashing with a configurable seed when the hash of a row begins.

2.0 Example Computer

Figure 1:
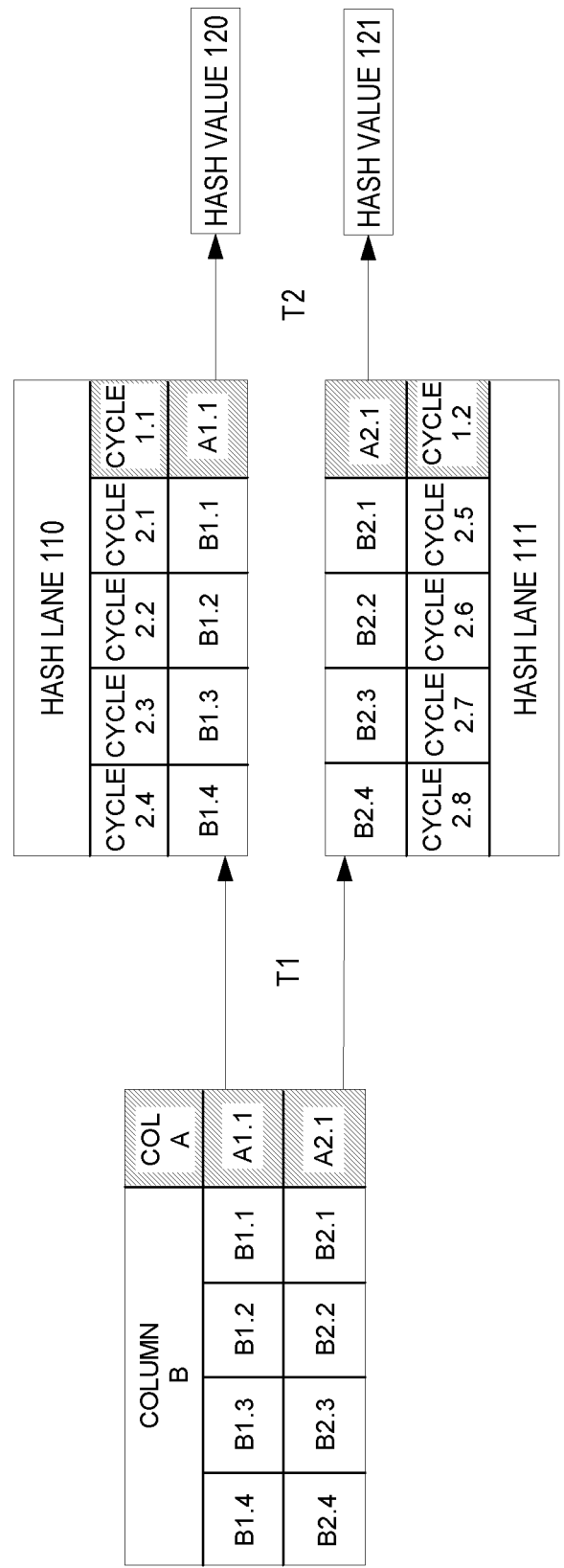
FIG. 1 is a block diagram that depicts an example hash engine that configures hardware to sustain real-time hashing throughput, in an embodiment.

FIG. 1 is a block diagram that depicts an example hash engine 100, in an embodiment. Hash engine 100 has dedicated hardware of high-performance hash lanes that hash data in real time.

Hash engine 100 may be a combination of at least one integrated circuit that accepts bulk content, such as a data stream. Hash engine 100 processes a fixed amount of the content during each hardware clock cycle to calculate or adjust at least one hash value.

Hash engine 100 has implementation flexibility, especially with regard to packaging and form factor. For example, hash engine 100 may be part of a general-purpose computer, such as a rack server, a personal computer, a mainframe, a smartphone, or other computer enclosure. Hash engine 100 may instead be part of a dedicated appliance or other device, such as a router or other network element, a disk controller, a host adapter, a disk array controller, a hardware accelerator, a stream encoder, or an encryption device such as a secure cryptoprocessor.

Hash engine 100 has fabrication flexibility. Hash engine 100 may be part of a system on a chip (SoC), may be self-contained within its own chip or package of chips, or as discrete components of varied fabrication integration. Hash engine 100 may be mounted on a printed circuit board (PCB) along with, or as part of, a controller, a microcontroller, a microprocessor, or a digital signal processor (DSP).

In an embodiment, hash engine 100 may process machine instructions or microcode. In another embodiment, hash engine 100 operates without instructions, and instead uses an application specific integrated circuit (ASIC) or other dedicated circuitry.

The content that hash engine 100 processes may be logically arranged into columns, such as A and B. Each column contains a set of data items or values.

Each column has a data type that all of the data items of the column conform to. For example, data types may be integers, real numbers, booleans, characters, character arrays, or other common data types such as primitive data types.

Each data type has a respective width or amount of bytes of memory needed to store a single data item of a column of that data type. Column A needs one byte, such as byte A1.1, to store a data item.

Column B needs four bytes, such as bytes B1.1-B1.4, to store a data item. For example, column B may store a machine-word integer. Depending on the capacity of hash engine 100, a column may have a larger data type, such as a double-precision floating-point number that has eight bytes.

Although only columns A-B are shown, hash engine 100 may process content having more columns. For example, hash engine 100 may process a batch of content having two columns as shown, and then later, although not shown, process another batch of another content stream having more or fewer columns and columns of other data types with other widths. The maximum column width and the maximum amount of columns depends on the implementation.

In this example, the data items of columns A-B are arranged as rows, such as records or other tabular data, perhaps from a database table. As shown, the column data has two rows, 1-2.

Initially, columns A-B may reside in memory. The data items of columns A-B may be comingled within one memory region, such as with row-major storage.

Alternatively, columns A and B may be stored as separate column arrays, such that the data items of column A occupy one memory region, and the data items of column B occupy a different memory region. Column arrays may implement column-major storage.

The purpose of hash engine 100 may be to hash data so rapidly that the hash engine may process a data stream in real time. Because a single hash lane may not have sufficient processing bandwidth required for an application, hash engine 100 has multiple hash lanes 110-111 that operate in parallel to combine their throughput.

At time T1, data is loaded into hash lanes 110-111. The hash lanes may be more or less identical. Hash lane 110 may be a processing unit that performs hash calculations in real time on a data stream.

In this example, time T1 spans hardware clock cycles 1.1-1.2 and 2.1-2.8. During each clock cycle, either or both of hash lanes 110-111 processes a byte of data.

If a data item has more than one byte, all of its bytes are eventually processed by a same hash lane. Data items A1 and B1 are for a same row. As such, all of the bytes of data items A1 and B1 are loaded into and processed by a same hash lane, such as shown in 110.

Hash lanes 110-111 may be synchronized by a shared clock signal. Likewise, hash lanes 110-111 both may update their respective hash values 120-121 with a shared clock frequency.

Because a data item may have multiple bytes, hash lane 110 may need multiple cycles to process one data item of one column.

For example, data item B1 of column B has data bytes B1.1-B1.4, which take four cycles (2.1-2.4) to be processed by hash lane 110. During cycles 2.5-2.8, the bytes (B2.1-B2.4) of data item B2 are processed by hash lane 111. During cycle 1.1, sole byte A1.1 of data item A1 of column A is processed by hash lane 110.

After time T1, bytes A1.1 and B1.1-B1.4 reside within hash lane 110, and bytes A2.1 and B2.1-B2.4 reside within hash lane 111. However not all of these bytes need reside within hash lane 110 or 111 simultaneously.

In an embodiment, only one data byte resides within hash lane 110 at a time. In another embodiment, hash lane 110 includes registers, a first-in first-out (FIFO), or other memory that holds one or more additional bytes that await individual processing.

At time T2, hash lane 110 emits hash value 120. For example, hash lane 110 may process a data byte, such as A1.1 during cycle 1.1, to calculate hash value 120.

Hash lane 110 calculates hash value 120 by applying a hash function to the data byte. For example, the hash function may be cryptographic (such as MD5, SHA-1, or RIPEMD-160), a checksum, a fingerprint, an error detection or correction code, or other data mapping function.

Hash value 120 may operate as an accumulator. For example, the hash function may update hash value 120 based on a combination of the prior value of hash value 120 and the current data byte value currently being processed.

Although times T1-T2 are shown as separate times, depending on how the hash function is organized and pipelined, times T1 and T2 may overlap. For example, during one cycle hash lane 110 may simultaneously hash several data bytes that have been loaded into the hash lane.

For example, during one cycle, bytes B1.3 and B1.4 may be loaded into hash lane 110 while bytes B1.1 and B1.2 are being hashed into the current accumulated hash value 120 which is based on the hash value of byte A1.1. Such pipelining allows the overall hash function to be broken up into smaller processing pieces which can increase hash bandwidth/throughput by allowing the cycle time to be reduced.

In an embodiment, hash lane 110 hashes one byte per cycle. In another embodiment, hash lane 110 hashes multiple bytes per cycle.

In an embodiment, how many bytes are processed by hash lane 110 per cycle is software programmable. In an embodiment, the hash function is software programmable.

In an embodiment, hash lane 110 emits each raw (unhashed) data byte, for downstream consumption. For example, hash engine 100 may be part of a disk controller that provides data to a client by reading the data from disk, hashing it, and forwarding the raw bytes to a controller buffer for eventual transfer to main memory. As such, hash engine 100, including hash lane 110, may be elements of the primary data path.

In an embodiment, hash lane 110 does not emit raw data. Instead, hash engine 100, including hash lane 110, receive one fork (copy) of the data stream, while the client receives another fork of the same stream. As such, hash lane 110 may be the end of a side branch that discards content after hashing it.

In an embodiment, hash lanes 110-111 may be loaded with data simultaneously. For example, clock cycles 1.1 and 1.2 may be a same cycle. In another embodiment, additional synchronization of hash lanes 110-111 avoids contention by including alternating turns to load data from a shared resource, such as memory or a data bus.

For example although hash lanes 110-111 simultaneously perform their individual hash calculations, each of hash lanes 110-111 may have a data buffer into which input data is loaded in small batches of data items. Hash lane 110 may have four bytes loaded during one set of clock cycles, while hash lane 111 is not loaded.

However during that set of cycles, both hash lanes 110-111 hash data that that were loaded earlier. In a next set of cycles, the roles may reverse, with hash lane 111 loading data into its buffer, and hash lane 110 not loading.

As shown, both hash lanes 110-111 load different rows from the same columns of a same original data stream, perhaps as part of processing a same file retrieval or database query. In another example, each of hash lanes 110-111 is dedicated to a separate data stream for a separate client request. For example, hash lane 110 may process one data stream retrieved from a file, and hash lane 111 may process another data stream from a database.

To avoid attempts to load a same input row, hash lanes 110-111 may be hardwired or programmable to load particular rows. For example, hash lane 110 may load odd rows, and hash lane 111 may load even rows. In an embodiment, hash lanes 110-111 share metadata that indicates which rows are already loaded, which rows are available for loading, or which hash lanes are currently loading which rows.

In an embodiment, the raw data loaded into hash lanes 110-111 may be joined into a combined output stream for downstream consumption. As such the rows may or may not be reordered.

In an embodiment, hash engine 100 may enter a low-power mode when not in use. In an embodiment, an individual hash lane may enter a low-power mode when not in use.

3.0 Example Hash Lane Process

Figure 2:
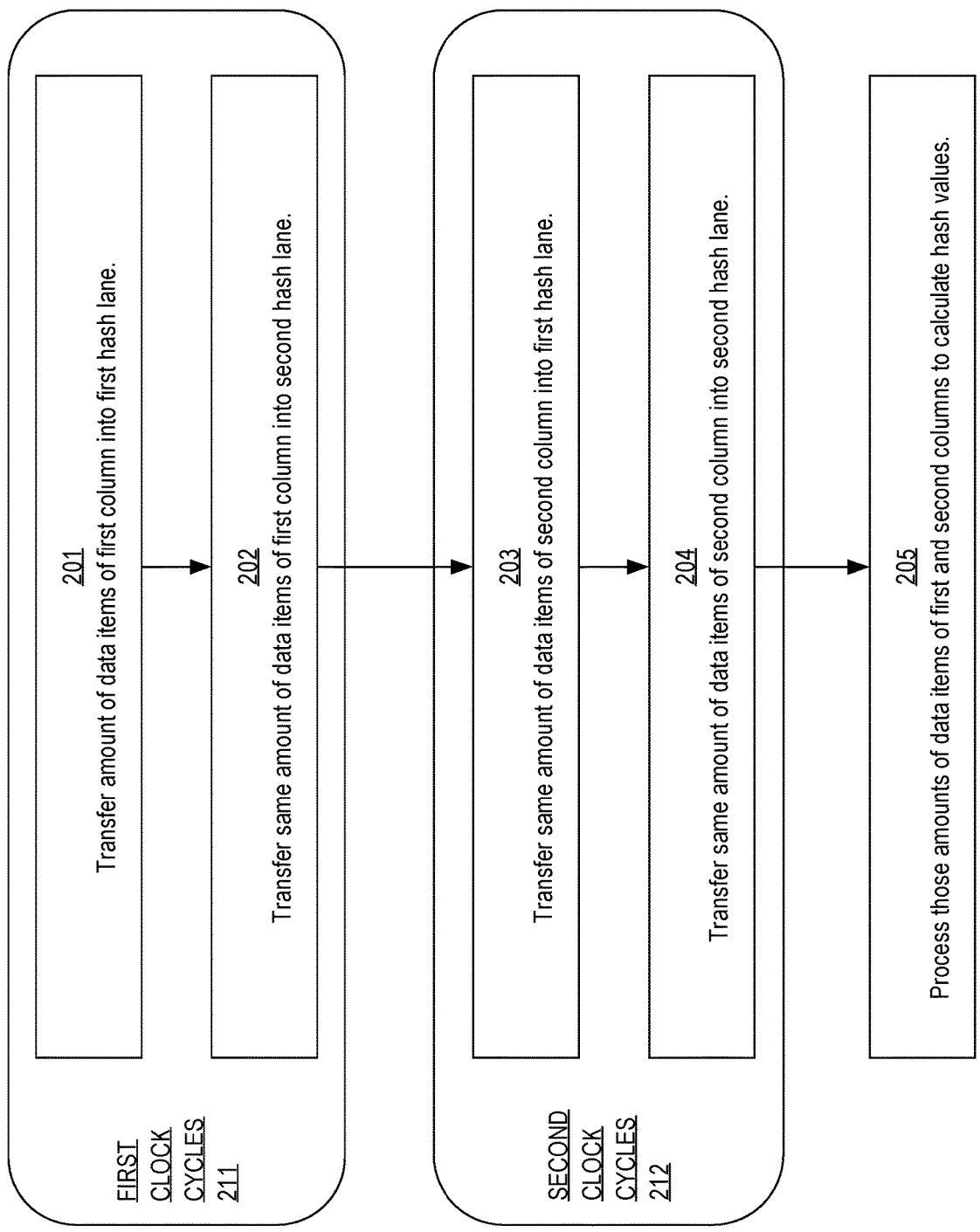
FIG. 2 is a flow diagram that depicts an example process that configures hardware to sustain real-time hashing throughput, in an embodiment.

FIG. 2 is a flow diagram that depicts an example hash lane process that uses dedicated hardware of high-performance hash lanes to hash data in real time, in an embodiment. This hash lane process is described in the context of FIG. 1.

Steps 201-202 occur during a first set of clock cycles, in which an amount of data items of a first data column are transferred into each of multiple hash lanes. For example during cycles 1.1-1.2, data bytes A1.1 and A1.2 are loaded into hash lanes 110-111 as two data items from column A.

Although not shown, step 201 may transfer multiple data items. For example if hash lane 110 has a storage capacity of sixteen bytes, and each data item of column B has four bytes, and hash lane 110 processes one byte per cycle, then 16/4=four data items may be loaded into hash lane 110 during a first set of 16/1=sixteen cycles. Whereas, if hash lane 110 processes two bytes per cycle, then only 16/2=eight cycles are needed to process the same sixteen bytes of data.

In an embodiment, one data item per clock cycle is transferred into hash lane 110. In the shown embodiment, each hash lane has one hash accumulator (not shown). For example, hash lane 110 has one accumulator, and the accumulator calculates hash value 120. For each data item transferred for a given column, hash lane 110 may need a separate accumulator. With one accumulator per lane, one data item is transferred into each hash lane from each column before transferring another data item from a different row into hash lane 110.

Steps 203-204 occur during a second set of clock cycles, in which the same amount of data items of a second data column are transferred into the hash lanes. For example during cycles 2.1-2.2, data bytes B1.1-B1.4 are loaded into hash lane 110 as one data item from column B, and data bytes B2.1-B2.4 are loaded into hash lane 111 as one data item. If step 201 transferred four data items, the step 203 would also transfer four data items.

In step 205, the data items that were transferred into the hash lanes during steps 201-204 are processed to calculate at least one hash value. For example, hash lane 110 hashes bytes A1.1 and B1.1-B1.4 to calculate hash value 120. During this step, hash lane 111 may also calculate hash value 121.

Hash value 120 is available to downstream consumers. For example, if hash value 120 is a cyclic redundancy check (CRC) code, then an operating system may read hash value 120, after it has accumulated results for all bytes of a file, to determine whether file integrity has been compromised.

Although only one hash value per hash lane is shown in FIG. 1, hash lane 110 may have multiple hash values. In an embodiment, each of multiple hash values is calculated by a distinct hash function. For example, each hash value may be calculated by a CRC hash function having a different polynomial. For example, each column may have its own accumulator and hash value for a same hash lane.

Hash value 120 may be an accumulator that is updated as hash lane 120 processes each byte or set of bytes. In an embodiment, step 205 may overlap with steps 201-204. For example, step 201 may transfer multiple bytes, one at a time, and hash lane 110 may hash an earlier byte while a later byte is being transferred.

4.0 Coordinated Loading of Hash Lanes

Figure 3:
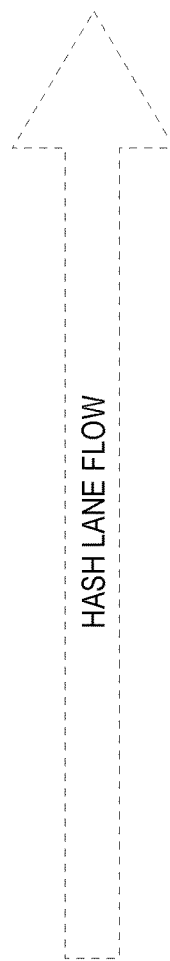
FIG. 3 is a block diagram that depicts an example hash engine that coordinates the loads of parallel hash lanes, in an embodiment.

FIG. 3 is a block diagram that depicts an example hash engine 305, in an embodiment. Hash engine 305 increases throughput by coordinating loading of hash lanes to achieve pipelining.

Hash engine 305 may be an implementation of hash engine 100. Hash engine 305 includes parallel hash lanes 301-302 and column memory 306.

Hash engine 305 processes a data stream that is naturally organized into rows that span columns A-C. The data stream is buffered in column memory 306, which may be an on-chip memory such as static RAM (SRAM).

Within column memory 306, the data stream has column-major storage, such that each of columns A-C is a column array. Within column memory 306 are at least rows 1-2 of each column A-C.

Column A is two bytes wide. Column B is four bytes wide. Column C is one byte wide. For example, row 1 of column A has data bytes A1.1 and A1.2.

Hash engine 305 has special operational constraints that enable it to coordinate the loading of data into hash lanes 301-302. These constraints are as follows.

All of the bytes of a row are loaded into a same hash lane. For example, row 1 has bytes A1.1-A1.2, B1.1-B 1.4, and C1.1, all of which are loaded into hash lane 301.

As shown, hash engine 305 loads data into the hash lanes during a timeline that spans seven clock cycles T1-T7. During each cycle, hash engine 305 loads a fixed amount of bytes into the hash lanes.

In this example, hash engine 305 loads two bytes per cycle. For some columns, exactly one data item may be loaded during a cycle. For example during T1, hash engine 305 loads data item A1 (bytes A1.1-A1.2) into hash lane 301.

For a wide column, a data item may need multiple cycles to load. For example, loading two bytes per cycle requires two cycles to load a four-byte data item.

For example, data item B1 is loaded during cycles T3-T4. Bytes B1.1-B1.2 are loaded during cycle T3. Bytes B1.3-B1.4 are loaded during cycle T4.

For a narrow column, multiple data items may be read from column memory 306 and loaded into multiple hash lanes during one cycle. For example, data items C1.1-C2.1 are loaded during cycle T7.

A narrow column may also be loaded into multiple hash lanes during one cycle. For example, data items C1.1-C2.1 are loaded into hash lanes 301-302 during cycle T7.

Data items may be read from column memory 306 and loaded into the hash lanes in batches to reap the efficiencies of a bulk transfer. However, a block transfer may need contiguity of bytes.

The bytes of any one column array, such as column A, B, or C, may be contiguous. However, multiple column arrays A-C are not guaranteed to be contiguous with each other within column memory 306.

Therefore, a block transfer from column memory 306 into the hash lanes may be limited to a single column. For example, cycles T3-T6 may be dedicated to transferring data exclusively for column B.

An amount of cycles needed to accomplish a block transfer may depend on a column width. For example, column B may need four (T3-T6) cycles for a block transfer. Whereas, column C may need only one cycle, T7, for a block transfer.

A same amount of data items may be transferred during a block transfer, regardless of column width. For example, the block transfers of any of columns A-C may each include two data items.

In a preferred embodiment, the combined bandwidth of hash lanes 301-302 matches the bandwidth of column memory 306. Matching bandwidth can be achieved by having an optimal number of hash lanes.

In a preferred embodiment, the input and output data rates of hash engine 305 are identical and constant. In this example, hash engine 305 loads two bytes per cycle, hashes two bytes per cycle, and may emit two content bytes per cycle. However in this example, each individual hash lane, such as 301, only has capacity to hash one byte per cycle. As such, both hash lanes 301-302 are needed for the aggregate hashing of hash engine 305 to keep pace with data delivered from column memory 306. Whereas, a preferred embodiment (not shown) each hash lane may hash four content bytes per cycle.

In this example, if hash engine 305 had only one hash lane, then hashing rows 1-2 would take twice as long to process, which would be fourteen clock cycles, instead of at full memory speed, which otherwise could deliver rows 1-2 in only seven cycles, as shown. For example, what appears to be bubbles/stalls (shown as empty cells, such as at T2 as shown) in hash lane 301 are not actually bubbles/stalls.

Instead hash lanes 301-302 as configured actually have a full hashing load. For example, although data item A1 (bytes A1.1-A1.2) is delivered to hash lane 301 in a single cycle, hash lane 301 may need two cycles to hash bytes A1.1-A1.2.

As such two hash lanes are needed to keep pace with column memory 306. Likewise, if hash engine 305 had more than two hash lanes, then some hash lanes may be sometimes or always idle.

According to those operational constraints, hash engine 305 uses parallel hash lanes to aggregate bandwidth, uses pipelining to achieve higher performance, and uses block transfers to boost throughput. These constraints achieve a coordination of hash lanes, as evident by the visually apparent stair-step patterns shown within hash lanes 301-302. Hash engine 305 may have a sequencer module that imposes this coordination.

The hardware modularity of hash engine 305 also confers design flexibility. For example, horizontal scaling may be achieved by adding more hash lanes. Likewise, vertical scaling may be achieved by increasing the capacity of a load cycle. For example, if loading two bytes per cycle into the hash lanes is inadequate (such as for hash lanes that each hash four bytes per cycle), then the load circuitry may be expanded to instead load four bytes per cycle.

Some combination of horizontal and vertical scaling may be sufficient to sustain throughput which matches or exceeds that of external memory and/or the throughput required by the application. In this way, hash engine 305 can be predictably calibrated for insertion directly into a general-purpose data path without impacting throughput.

5.0 Database and DMA

Figure 4:
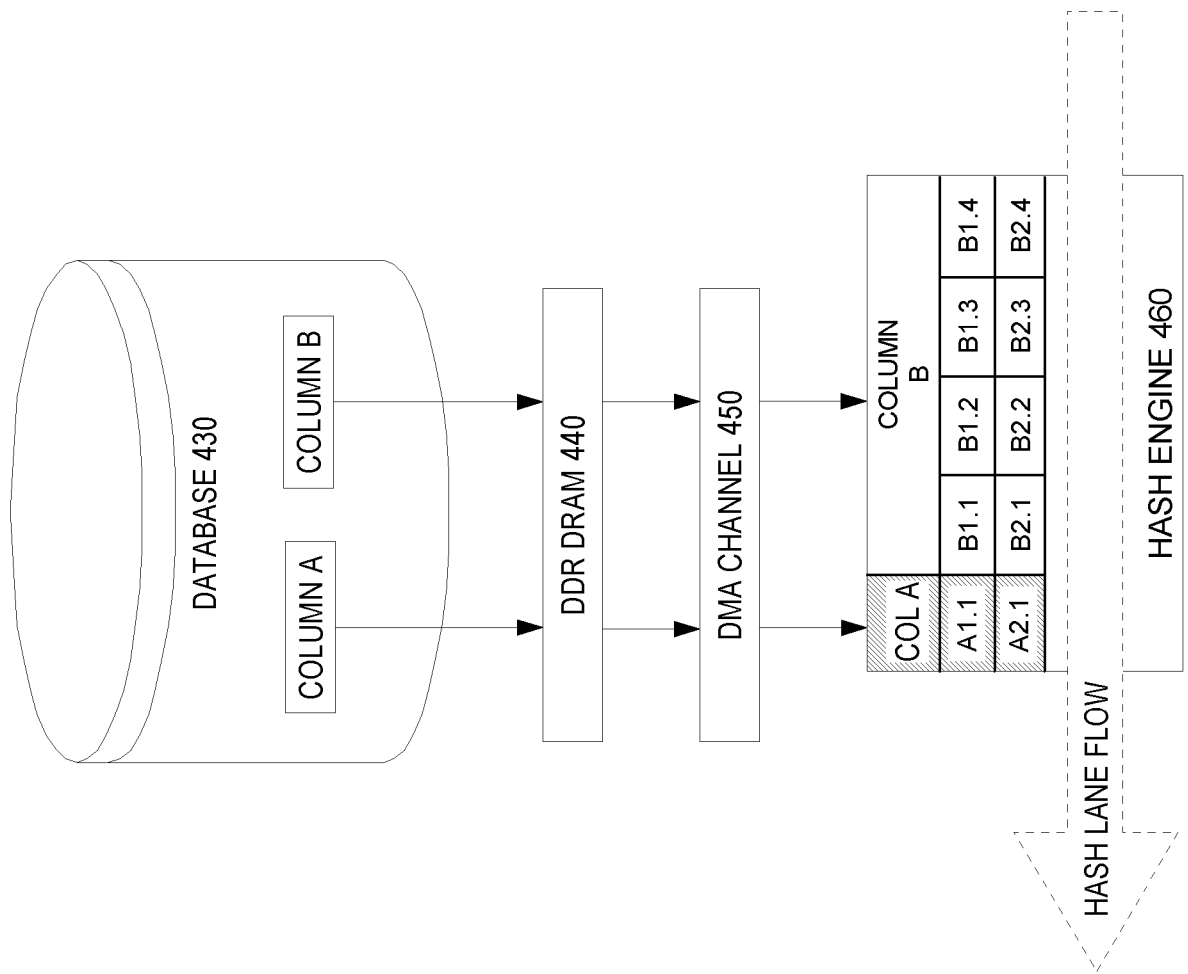
FIG. 4 is a block diagram that depicts an example computer that hashes database columns in real time, in an embodiment.

FIG. 4 is a block diagram that depicts an example computer 400, in an embodiment. Computer 400 has an input data path that streams input data from database 430 on disk, through memory, and into hash engine 460. Hash engine 460 may be an implementation of hash engine 100.

Computer 400 includes dynamic random access memory (DRAM) 440, direct memory access (DMA) channel 450, database 430, and hash engine 460. Database 430 is on disk or remote.

Database 430 contains columns A-B of a table. Throughput is increased if columns A-B are stored within database 430 in column-major format.

Perhaps in response to a query, computer 400 copies some or all of columns A-B into DRAM 440, which may be a main memory and may optionally provide column-major storage. DRAM 440 may be a dual data rate (DDR) DRAM, a reduced-latency DRAM (RLDRAM), or any bulk memory whether dynamic, static, or non-volatile.

As shown, hash engine 460 has two lanes. Hash engine 460 may use a direct memory DMA channel, such as 450, of a DMA controller to use a block transfer to load data from DRAM 440 into a hash lane or on-chip memory, such as a cache or local SRAM. In an embodiment, hash engine 460 may centrally orchestrate block transfers into hash lanes. In another embodiment, each hash lane temporarily acquires or permanently owns a DMA channel that it uses to fetch data to process.

In an embodiment, the peak bitrate of DRAM 440 does not exceed the peak bitrate of hash engine 460. In this embodiment, hash engine 460 sustainably processes the content stream in real time.

Hash engine 460 applies a hash function that may have special relevance to database applications. For example, the hash value that a hash lane calculates may be used as a key for a hash join that perhaps implements a join clause of a structured query language (SQL) query. In another example, the hash value may be used to implement a filtration criterion, perhaps as part of a where clause of an SQL query. In another example, the hash value may have desirable spreading characteristics and may be used to partition rows of a table to different processors in a multi-core processing system.

For example, a compound criterion may select people (rows) having an adult age (column A) and living in a given zip code (column B). A hash function may be applied to the two columns to provide a hash value. In some applications, extracting a single-bit from a calculated hash value may be used for filtration or other binary decisions.

In this case, a downstream application (or logic associated with the hash engine itself) could read the hash value for a current row to decide whether the row should be selected or filtered out. As such, the hash value would not be an accumulator, but would instead be recalculated from scratch for each row.

6.0 Packet Sniffing

Figure 5:
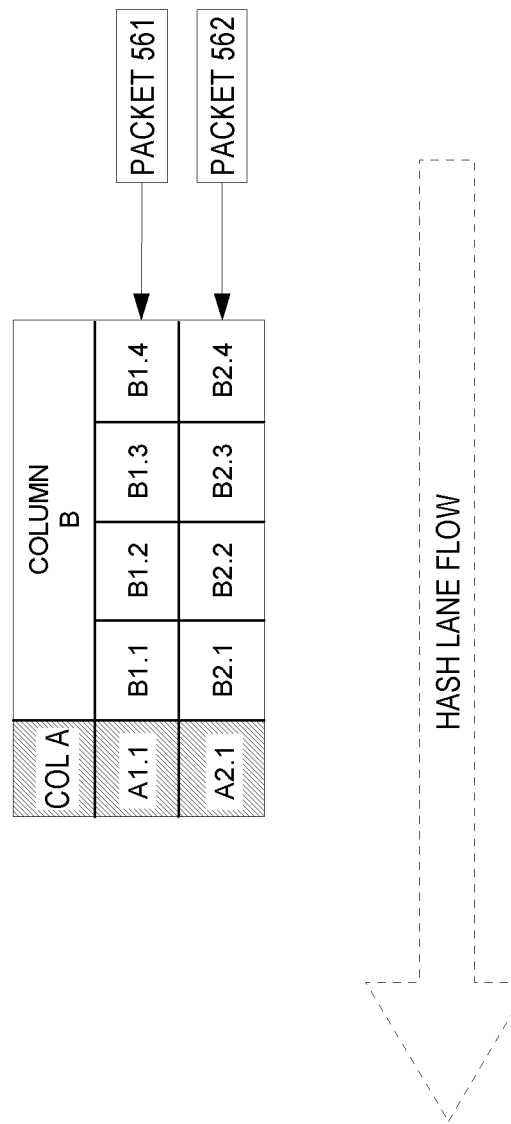
FIG. 5 is a block diagram that depicts an example hash engine that hashes network packets in real time, in an embodiment.

FIG. 5 is a block diagram that depicts an example hash engine 500, in an embodiment. Hash engine 500 has an input data stream that arrives over a network. Hash engine 500 may be an implementation of hash engine 100.

The input data stream is organized as rows, and each row arrives in its own network packet, such as 561-562. Packets 561-562 may be internet protocol version 4 (IPV4) packets.

In one example, a row is extracted from an interesting portion(s) of a packet payload. For example, an IPV4 packet commonly has a 20-byte header having multiple control fields and a body (payload).

A computer may extract the body or some or all of the header for loading into the hash engine or memory as one row. Alternatively, each entire packet or packet body may be a row.

In another example, packets 561-562 are Ethernet frames. Each frame may contribute interesting fields to a row, such as the preamble, MAC address, or payload.

Regardless of protocol, packets 561-562 likely bear an error detection code such as a CRC code or checksum. If it has a CRC code, the hash engine may recalculate the CRC code based on the content of the packet to check whether the recalculated CRC code matches the sent CRC code.

In another example, the hash value may be read to determine a packet classification, such as a particular protocol (e.g. TCP or UDP), an application type, or a user session. Hash engine 500 may be part of a packet sniffer, which may facilitate a firewall, a router, a traffic analyzer, an intrusion detector, or a governor of quality of service (QoS).

7.0 Content Routing

Figure 6:
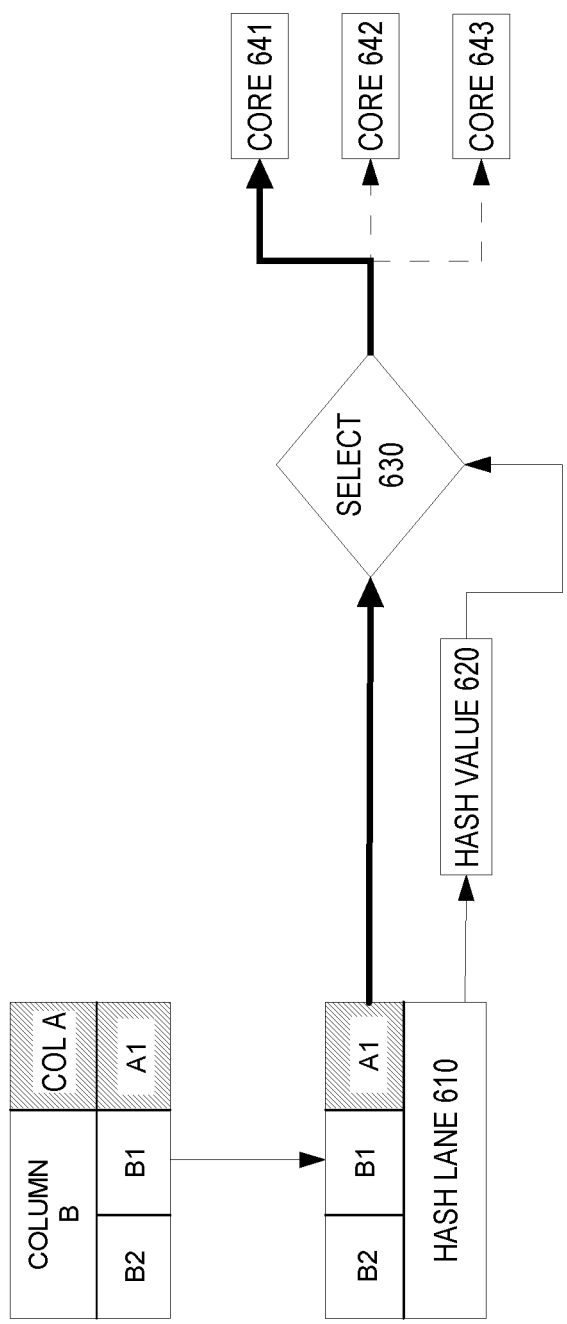
FIG. 6 is a block diagram that depicts an example computer that routes content based on real-time hashing, in an embodiment.

FIG. 6 is a block diagram that depicts an example computer 600, in an embodiment. Computer 600 has a hash engine that performs routing, such as load balancing. The hash engine may be an implementation of hash engine 100.

The hash engine may be part of a high-performance data path. The stream of content may have such high bandwidth that a downstream uniprocessor that analyzes, processes, or otherwise consumes the stream would be overwhelmed.

Computer 600 may have multiple processing cores, such as 641-643, that each consumes some of the content stream. Although an individual core may have insufficient bandwidth, the combined bandwidth of cores 641-643 is sufficient to process the content stream in real time.

A hash lane, such as 610, may be loaded with a record with columns A-B stored in bytes A1 and B1-B2. Hash lane 610 may process each record to calculate hash value 620.

After processing a record, hash lane 610 emits the record along with hash value 620. The emitted record and hash value 620 may be available to select 630.

Select 630 may have distinct circuitry or may be part of hash lane 610. Select 630 may be implemented in hardware, software, or some combination of them. As such, select 630 may be software configurable.

Select 630 processes hash value 620 to make a content-based routing decision. For example, select 630 may apply a modulo-three operation to hash value 620 to decide which of three downstream cores 641-643 should consume the record.

Select 630 need not examine the record itself. Select 630 may signal hardware to conduct the record to whichever core that select 630 chooses based on hash value 620.

In this example, content-based routing is used to distribute the load to multiple cores. In other examples, the multiple destinations of select 630 are components other than cores.

The destinations may be separate disks, separate network interfaces, separate buffers, separate inter-process sockets or queues, or separate applications. For example, select 630 may perform error checking based on hash value 620 and route erroneous records to one file and non-erroneous records to another file.

In an embodiment, select 630 implements content addressable routing. For example, computer 600 may use select 630 to stream records to different cores (or other destinations) based on column values.

For example, hash value 620 and select 630 may coordinate to achieve range-based routing. For example, column A may have HTTP response codes, and core 641 may receive all records with 200-series (2XX) success codes,

8.0 Seeding and Resumption

Figure 7:
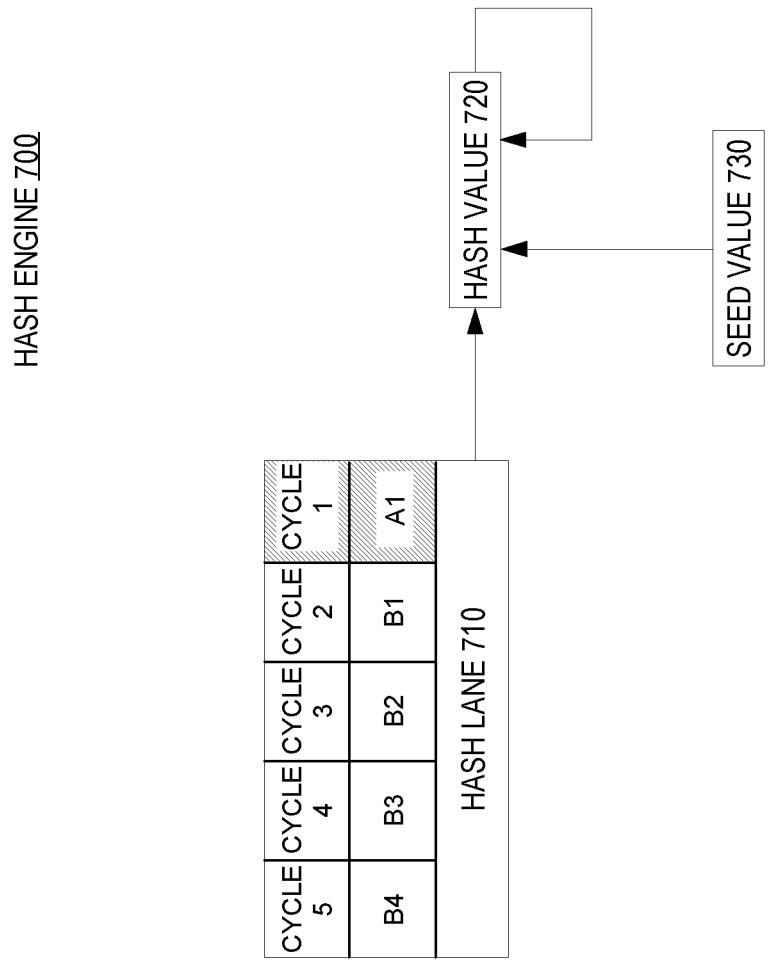
FIG. 7 is a block diagram that depicts an example hash engine that may preempt and resume real-time hashing, in an embodiment.

FIG. 7 is a block diagram that depicts an example hash engine 700, in an embodiment. Hash engine 700 accepts a hash seed, perhaps to resume prior work. Hash engine 700 may be an implementation of hash engine 100.

Hash engine 700 includes hash lane 710 that calculates hash value 720. Hash value 720 may be an accumulator that may be updated for each byte that hash lane 710 processes.

For example, hash value 720 may accumulate a CRC code that is calculated from the byte content of a file. However, the file may be low priority and may be preempted by higher priority content, perhaps to prevent priority inversion.

For example, hash value 720 may be implemented with a pushdown stack. Whenever hash lane 710 is preempted by more important traffic, hash value 720 may push its current value down into the stack for safe keeping.

Eventually, hash lane 710 may resume processing the interrupted low-priority content. Resumption may be achieved by restoring a saved value into hash value 720. The saved value is shown as seed value 730.

Seed value 730 may be obtained by popping the stack. Alternatively, seed value 730 may be software configurable and perhaps copied from memory.

As such, hash engine 700 may schedule and reschedule work according to quality of service (QoS) promises. In another example, seed value 730 may not represent work to be resumed, but instead supports an algorithm that uses a seed for another purpose, as with cryptography.

9.0 Descriptors

Figure 8:
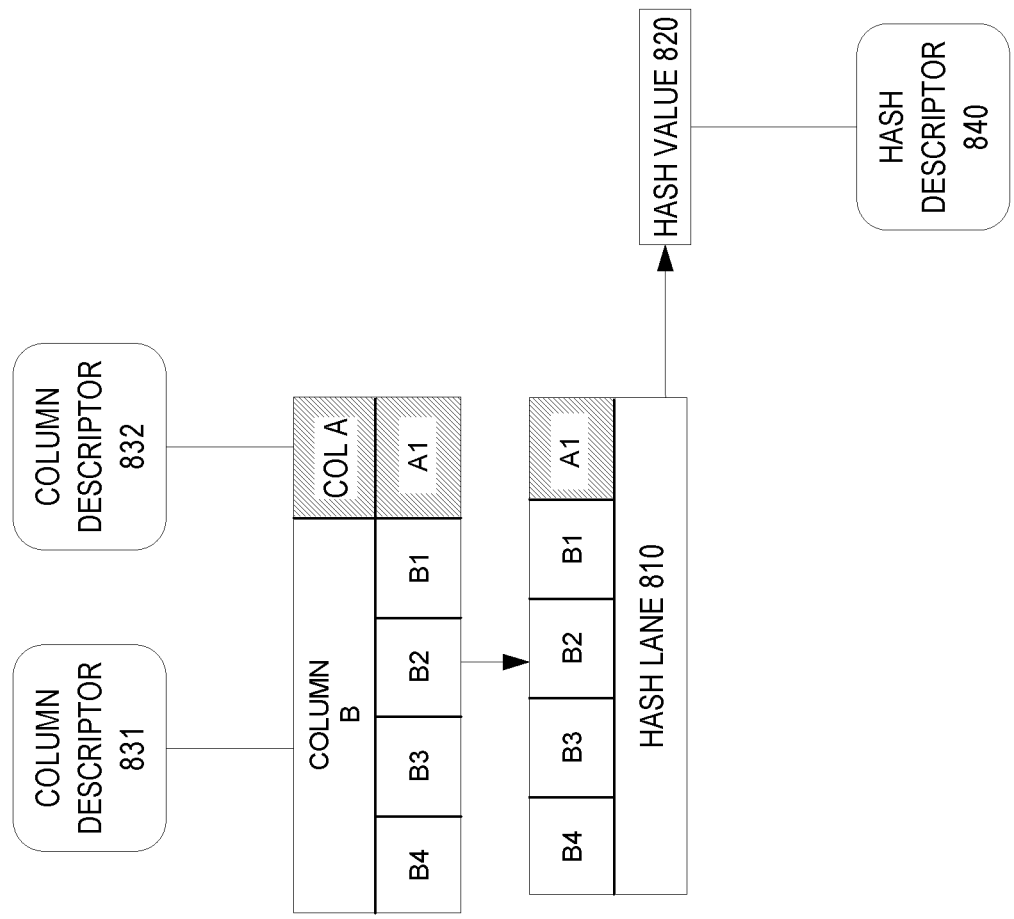
FIG. 8 is a block diagram that depicts an example hash engine that uses descriptors for software configurability, in an embodiment.

FIG. 8 is a block diagram that depicts an example hash engine 800, in an embodiment. Hash engine 800 uses descriptors to achieve software configurability. Hash engine 800 may be an implementation of hash engine 100.

Descriptors, such as 831-832 and 840, enable a hash engine 800 to be more or less data driven. This allows software configurability that achieves dynamic customization needed to switch between distinct applications.

If hash engine 800 or hash lane 810 includes a processor that processes microcode or other machine instructions, then there is ample flexibility to achieve dynamic customization. However, such custom coding may be tedious and error prone and may require significant processor resources.

As an alternative to custom coding, descriptors may simplify customization according to predetermined patterns that are parameterized. To use a descriptor, hash engine 800 or hash lane 810 must parse or otherwise digest the descriptor to extract parameters.

Extracted parameters are then used to configure hash engine 800 or hash lane 810. Such extraction and configuration may be performed directly by hardware or delegated to microcode or other reusable instructions.

Hash descriptor 840 declares aspects of hash value 820, such as how hashing is calculated and perhaps to where downstream to transmit hash value 820. Hash descriptor 840 may specify various details such as a seed value, an identifier of a stock hash function, a pointer to instructions of a custom hash function, whether to operate as an accumulator, at what interval to reset the accumulator between records, content priority, how to publicize hash value 820, how to announce exhaustion of all input rows, and where to relay the raw data downstream, if at all.

A software application may create, populate, and submit hash descriptor 840 to hash engine 800 or hash lane 810, depending on the implementation. In an embodiment, each hash lane may have its own hash descriptor. In another embodiment, multiple hash lanes may share a hash descriptor.

Each of column descriptors 831-832 declares aspects of a column, such as A or B. A column descriptor, such as 831, may specify various details such as database column metadata, column data width, column data type, a pointer to column-major memory, a column offset within the rows of row-major storage, a count of rows, and an ordering relative to other columns for loading a given row into hash lane 810. For example, column descriptors 831-832 may each have a unique rank that configures bytes B1-B4 of column B to be loaded into hash lane 810 after byte A1 of column A.

If hash lane 810 supports preemption, then hash lane 810 may have one or more pushdown stacks for hash descriptors or column descriptors. In an embodiment, descriptors 831-832 may be bundled as a unit of work that is submitted to hash engine 800. For example, hash engine 800 may maintain a backlog queue of units of work that wait to be processed by hash engine 800.

10.0 Progress Pointer

Figure 9:
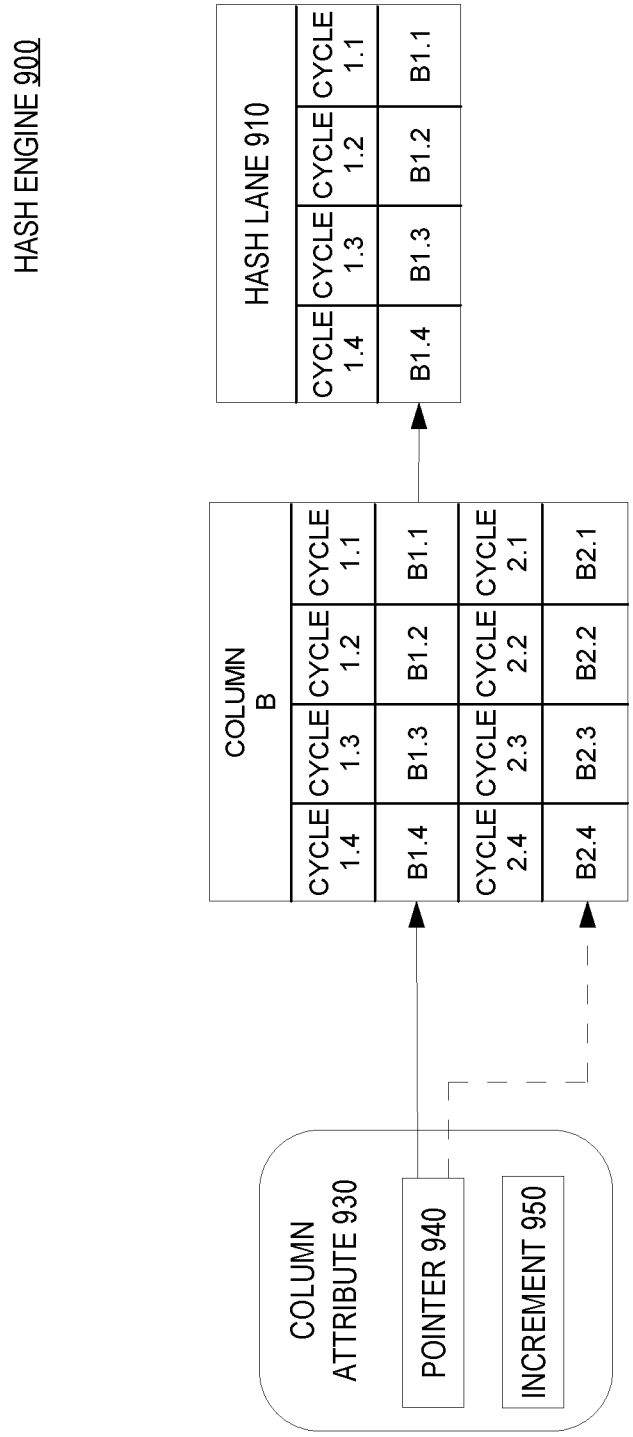
FIG. 9 is a block diagram that depicts an example hash engine that adjusts a column pointer, in an embodiment.

FIG. 9 is a block diagram that depicts an example hash engine 900, in an embodiment. Hash engine 900 maintains a column attribute that tracks the progress of a column. Hash engine 900 may be an implementation of hash engine 100.

Hash lane 910 loads a same amount of data items for each column. For example, if a database table has many rows that span two columns, and hash lane 910 loads a data item (row) from the first column, then hash lane 910 will also load a data item (row) from the second column, even if the two columns have different widths and a data item takes a different amount of time to load, depending on its column width.

A consequence of this is that even though a same amount of data items are loaded from both columns, the amount of bytes loaded from both columns differs. If the input data has column-major storage of different widths, hash lane 910 may need to independently track its progress for each column.

For simplicity of depiction, FIG. 9 shows only column B. However, the following technique may be repeated for other columns.

Hash lane 910 (or hash engine 900) maintains column attribute 930 for column B. Other columns may have separate column attributes.

Column attribute 930 contains pointer 940 and increment 950. Pointer 940 is a memory pointer that indicates the memory address of a next data item or set of data items of column B to read from memory and load into hash lane 910.

After reading the next data item(s), pointer 940 must be advanced to point to the next unread data item of column B. Pointer advancement involves pointer math that depends on various factors.

For example, if column B were one byte wide, has column-major storage, and is loaded into hash lane 910 one row at a time, then advancing pointer 940 is straightforward. In such a case, pointer 940 need only be incremented by one after each read.

However, if the width of column B has multiple bytes (as shown), then pointer 940 would need advancing by that column byte width after each read. Furthermore and although not shown, if hash lane 910 reads multiple data items (rows) from column B as a batch, such as two data items of four bytes each, then pointer 940 would need advancing by 2×4=eight bytes after each read.

As shown, hash lane 910 is loaded with one data item at a time that has four bytes. After being loaded with data item B1 from column B, hash lane 910 may be loaded with the same amount of data items from other columns.

Eventually, hash lane 910 is ready to be loaded with a next data item (B2) from column B. To ensure that hash lane 910 is loaded with data from the correct memory location, pointer 940 must be advanced by four bytes between reads of data items B1 and B2.

Before this advancement, pointer 940 points to item B1, as shown by the solid arrow. Whereas after advancement, pointer 940 points to item B2, as shown by the dashed arrow.

Pointer advancement is further complicated by row-major storage, which comingles data items of multiple columns in memory. This complicates pointer advancement because it must account not only for data item(s) of column B, but also for any data items read for other columns, even though column attribute 930 and pointer 940 are associated only with column B.

For example and although not shown, a column A may be one byte wide, and a column C may be two bytes wide. As such and given that column B is four bytes wide, if hash lane 910 is loaded with one row per batch, then pointer 940 must advance 1+4+2=seven bytes after each read. Whereas, if hash lane 910 is loaded with three rows per batch, then pointer 940 must advance 7*3=21 bytes after each read.

Fortunately, the amount that pointer 940 must advance is constant during the processing of a given stream of columns. As such, column attribute 930 may be initialized once with increment 950 that specifies by how much pointer 940 advances after each read. After initialization of column attribute 930 and throughout the processing of the given stream, increment 950 may be immutable.

If hash lane 910 supports preemption, then all of the column attributes, such as 930, for a stream may be saved on a pushdown stack or in other memory.

11.0 Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 10:
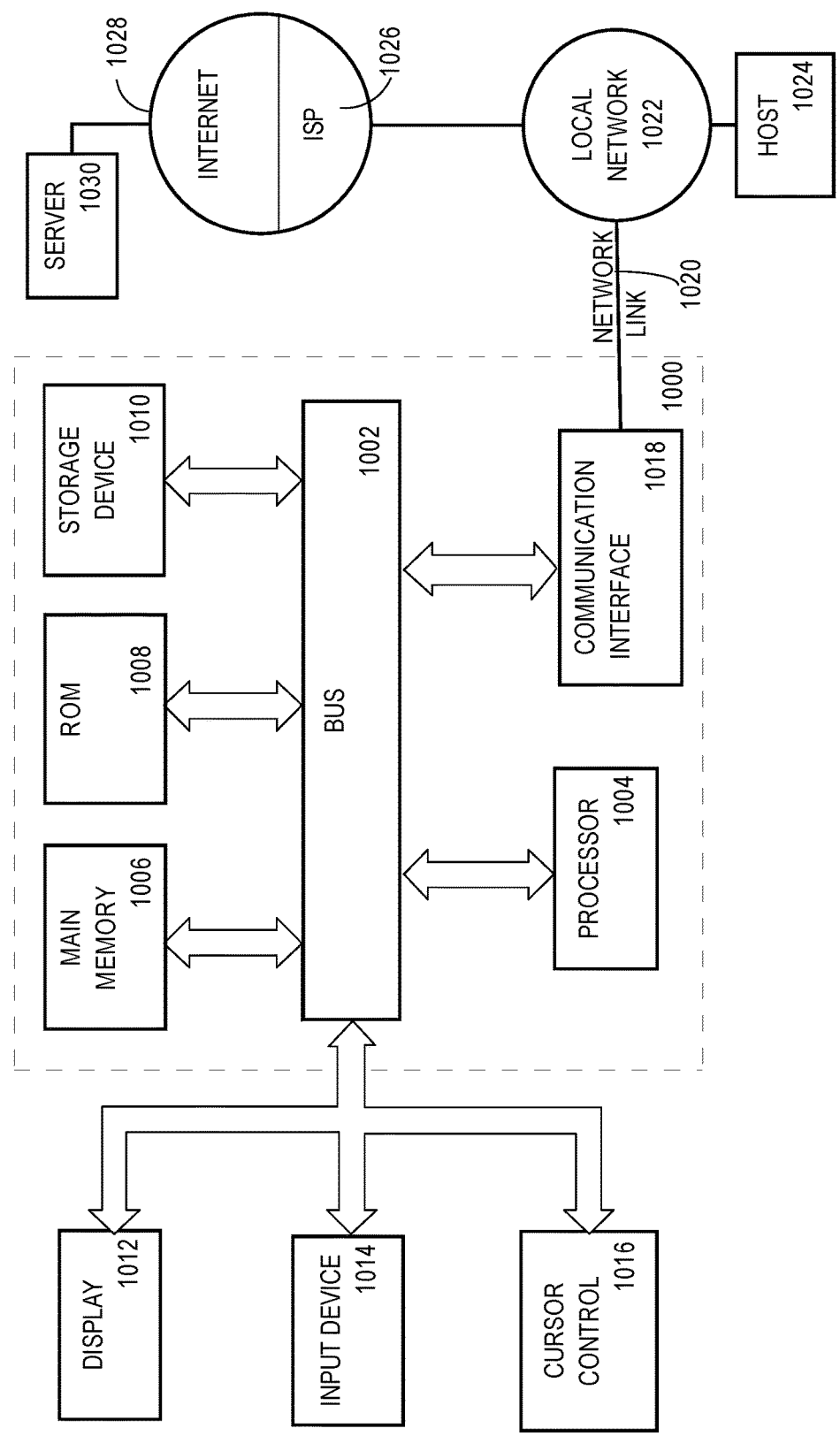
FIG. 10 is a block diagram that illustrates a computer system upon which an embodiment of the invention may be implemented.

For example, FIG. 10 is a block diagram that illustrates a computer system 1000 upon which an embodiment of the invention may be implemented. Computer system 1000 includes a bus 1002 or other communication mechanism for communicating information, and a hardware processor 1004 coupled with bus 1002 for processing information. Hardware processor 1004 may be, for example, a general purpose microprocessor.

Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Such instructions, when stored in non-transitory storage media accessible to processor 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 1010, such as a magnetic disk or optical disk, is provided and coupled to bus 1002 for storing information and instructions.

Computer system 1000 may be coupled via bus 1002 to a display 1012, such as a cathode ray tube (CRT), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

Computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 1010. Volatile media includes dynamic memory, such as main memory 1006. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018.

The received code may be executed by processor 1004 as it is received, and/or stored in storage device 1010, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
configuring a first hash lane and a second hash lane by processing a first descriptor of a first data column to determine a plurality of clock cycles that will be needed to process a particular amount of data items of the first data column;
dynamically reconfiguring the first hash lane and the second hash lane by processing a second descriptor of a second data column to determine a set of clock cycles that will be needed to process same said particular amount of data items of the second data column, wherein:
the plurality of clock cycles does not overlap with the set of clock cycles, and
the plurality of clock cycles has a different amount of cycles than the set of clock cycles;
during the plurality of clock cycles:
transferring said particular amount of data items of said first data column into the first hash lane, and
transferring said particular amount of data items of said first data column into the second hash lane;
during the set of clock cycles:
transferring said particular amount of data items of said second data column into said first hash lane, and
transferring said particular amount of data items of said second data column into said second hash lane;
processing said particular amount of data items of said first and second data columns to calculate a set of hash values;
wherein said method is performed by one or more hardware processors.

2. The method of claim 1 further comprising receiving said particular amount of data items of said first and second data columns from a tabular database.

3. The method of claim 1 wherein:
said first and second data columns comprise a plurality of data rows;
each data row of said plurality of data rows contains one data item from each of said first and second data columns;
the method further comprises receiving each data row, of said plurality of data rows, within a separate network packet.

4. The method of claim 1 wherein:
said first and second data columns comprises a plurality of data rows;
each data row of said plurality of data rows contains one data item from each of said first and second data columns;
processing said particular amount of data items of said first and second data columns to calculate a set of hash values comprises calculating a separate hash value for each data row of said plurality of data rows.

5. The method of claim 4 wherein calculating a separate hash value for each data row comprises calculating multiple hash values for the data row.

6. The method of claim 4 wherein calculating a separate hash value for each data row comprises:
calculating, in a prior clock cycle, a partial hash value based on a first part of the data row;
adjusting, in a later clock cycle, said partial hash value based on a second part of the data row.

7. The method of claim 4 further comprising selecting, based on said separate hash value of a data row of said plurality of data rows, a destination for said data row.

8. The method of claim 7 wherein said destination comprises a processor core.

9. The method of claim 1 wherein said set of hash values comprises an error-detecting code.

10. The method of claim 1 wherein processing said particular amount of data items of said first and second data columns to calculate a set of hash values comprises calculating at least one hash value of said set of hash values based on a software-configurable seed value.

11. The method of claim 10 wherein processing said particular amount of data items of said first and second data columns to calculate a set of hash values comprises:
processing, in a prior clock cycle, first one or more bytes from the first hash lane to calculate said software-configurable seed value;
processing, in a current clock cycle that occurs after said prior clock cycle, second one or more bytes from the second hash lane to calculate at least part of a first hash value of said set of hash values;
processing, in a later clock cycle that occurs after said current clock cycle, third one or more bytes from said first hash lane to calculate, based on said software-configurable seed value, at least part of a second hash value of said set of hash values.

12. The method of claim 1 further comprising receiving said first or said second data column from a dynamic memory access (DMA) channel.

13. The method of claim 1 wherein:
the method further comprises receiving said first and second data columns from a dynamic random access memory (DRAM);
a peak bitrate of said DRAM does not exceed a peak bitrate of the method.

14. The method of claim 1 wherein transferring each data item of a respective first subset of data items is based on a software-configurable descriptor.

15. The method of claim 1 wherein processing said particular amount of data items of said first and second data columns to calculate a hash value is based on a software-configurable descriptor.

16. The method of claim 1 wherein a hash value of said set of hash values consists essentially of one bit.

17. The method of claim 1 wherein:
transferring said particular amount of data items of said first data column is based on a column attribute that comprises:
a pointer to unprocessed data items of said first data column; and
a count of bytes needed to store one data item of said first data column;
the method further comprises:
generating said column attribute before said plurality of clock cycles;
adjusting said pointer of said column attribute after said plurality of clock cycles.

18. A device comprising:
a random access memory (RAM) configured to store a first data column and a second data column;
a plurality of processors, connected to said RAM, wherein each of said plurality of processors is configured to perform:
configuring a first hash lane and a second hash lane by processing a first descriptor of the first data column to determine a plurality of clock cycles that will be needed to process a particular amount of data items of the first data column;
dynamically reconfiguring the first hash lane and the second hash lane by processing a second descriptor of the second data column to determine a set of clock cycles that will be needed to process same said particular amount of data items of the second data column, wherein the plurality of clock cycles does not overlap with the set of clock cycles, and the plurality of clock cycles has a different amount of cycles than the set of clock cycles;
during the plurality of clock cycles, receive said particular amount of data items of said first data column;
during the set of clock cycles, receive said particular amount of data items of said second data column;
process said particular amount of data items of said first and second data columns to calculate a set of hash values.

19. One or more non-transitory computer-readable media storing instructions that, when executed by one or more processors, cause:
configuring a first hash lane and a second hash lane by processing a first descriptor of a first data column to determine a plurality of clock cycles that will be needed to process a particular amount of data items of the first data column;
dynamically reconfiguring the first hash lane and the second hash lane by processing a second descriptor of a second data column to determine a set of clock cycles that will be needed to process same said particular amount of data items of the second data column, wherein:
the plurality of clock cycles does not overlap with the set of clock cycles, and
the plurality of clock cycles has a different amount of cycles than the set of clock cycles;
during the plurality of clock cycles:
transferring said particular amount of data items of said first data column into the first hash lane, and
transferring said particular amount of data items of said first data column into the second hash lane;
during the set of clock cycles:
transferring said particular amount of data items of said second data column into said first hash lane, and
transferring said particular amount of data items of said second data column into said second hash lane;
processing said particular amount of data items of said first and second data columns to calculate a set of hash values.

20. The method of claim 1 wherein, during said plurality of clock cycles, said transferring into said first and second hash lanes simultaneously occurs.

* * * * *